Oct. 4, 1927.

W. E. HOLLAND ET AL 1,644,590

STORAGE BATTERY

Filed March 5, 1923

2 Sheets-Sheet 1

Inventors
Walter E. Holland, William H. Grimditch
by their Attorneys
Howson & Howson

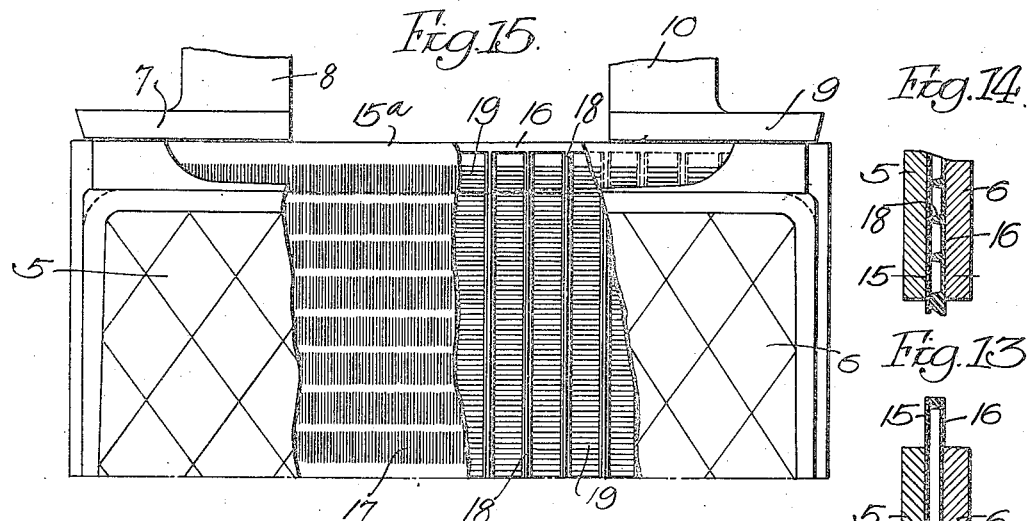
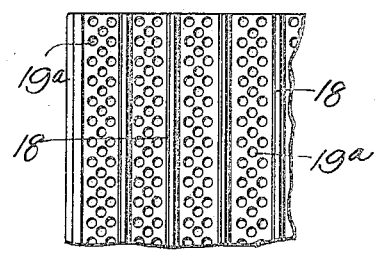
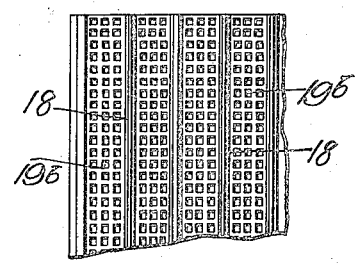
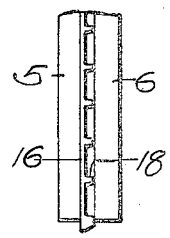
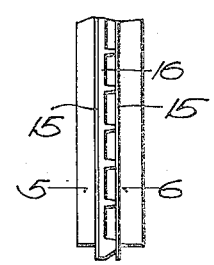
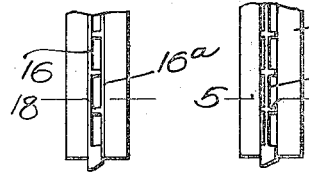
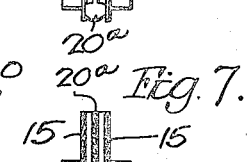
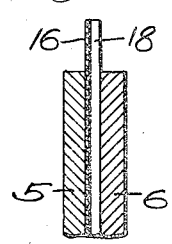
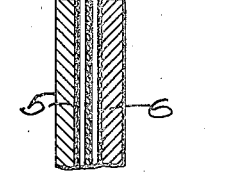

Patented Oct. 4, 1927.

1,644,590

UNITED STATES PATENT OFFICE.

WALTER E. HOLLAND AND WILLIAM H. GRIMDITCH, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

STORAGE BATTERY.

Application filed March 5, 1923. Serial No. 622,846.

One object of our invention is to provide a reversible or storage battery having dry charged plates and separators of such a nature and so assembled that the battery may be put into use at either high or low discharge rates, without charging, very soon after filling with suitable electrolyte.

Another object of our invention is to provide a storage battery or a renewal element for the same which may be kept indefinitely without deterioration or loss of charge, and which, when filled with or placed in suitable electrolyte, will be ready for discharge without requiring an initial charge.

We also desire to provide an improved form of lead-acid storage battery including separators of perforated acid-proof material in place of the usual wood or equivalent separators.

Figure 2:
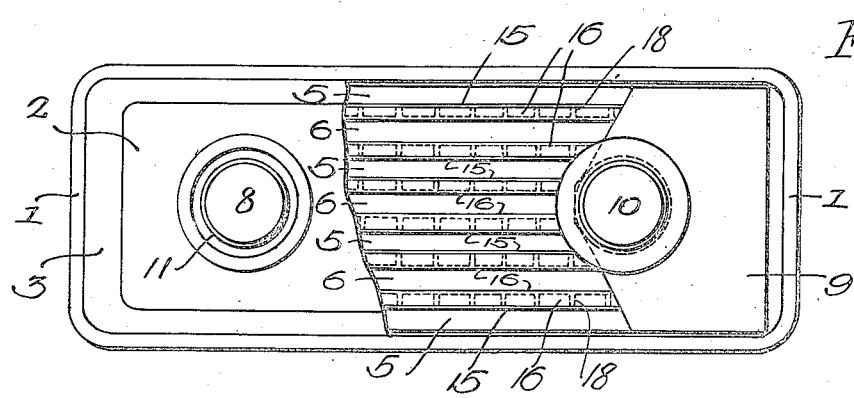
Figure 1:
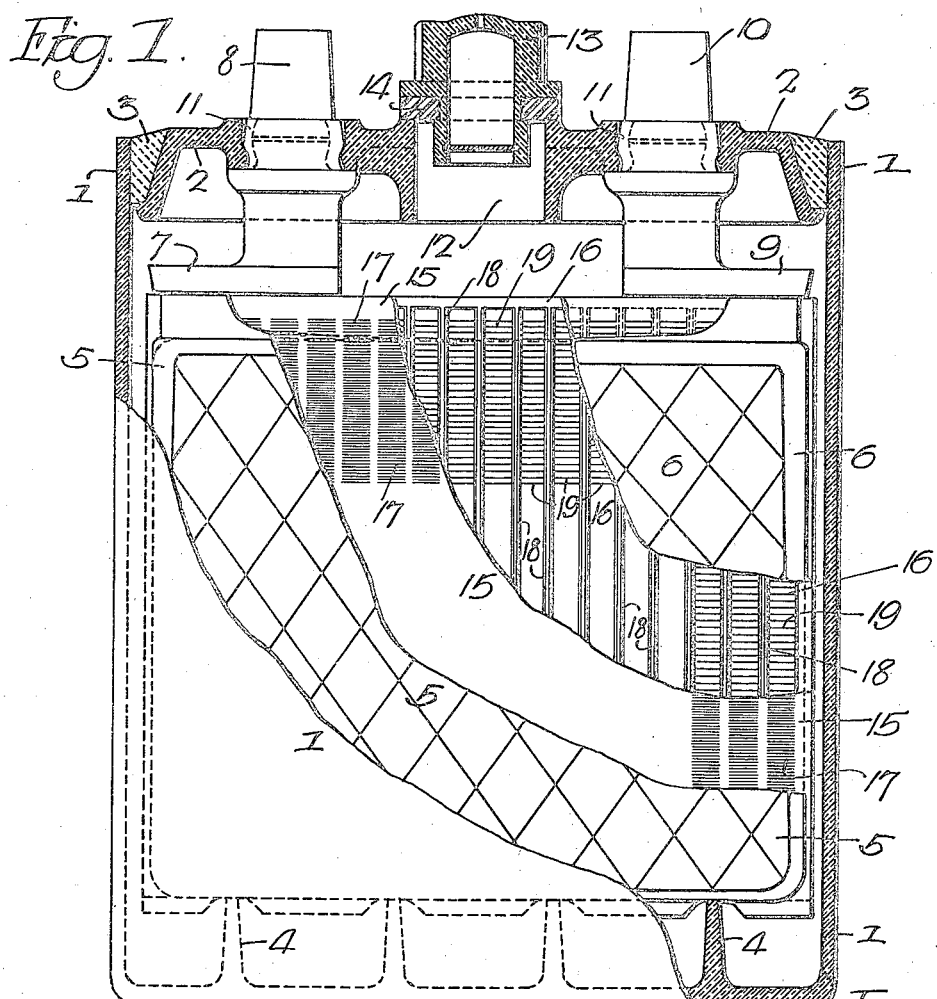

These objects and other advantageous ends we attain as hereinafter set forth, reference being had to the accompanying drawings in which, Fig. 1, is an elevation, partly in vertical section, illustrating the construction of a storage battery cell embodying our invention, portions being broken away to show the detail construction and arrangement of parts;

Fig. 2, is a plan of the battery cell shown in Fig. 1, part of the top being broken away to show the arrangement of the plates and separators;

Figs. 3, 5, 7, 9, 11, and 13 are fragmentary vertical sections to some extent diagrammatic, illustrating modified arrangements of plates and separators which may be used in carrying out our invention;

Figs. 4, 6, 8, 10, 12, and 14 are plans respectively of the combinations shown in Figs. 3, 5, 7, 9, 11, and 13.

Fig. 15 is a partial elevation similar to Fig. 1 illustrating one of the modifications of our invention, and Figs. 16 and 17 are fragmentary elevations of separators illustrating alternative forms of perforation which may be used in carrying out our invention.

In the above drawing 1 represents a suitable container, such as a jar of hard rubber, celluloid, glass or the like, having a suitable cover 2 between which and the top portion of the container is placed suitable sealing compound 3.

The container preferably has parallel ribs 4 projecting upward from its bottom on which rest the plates and separators of the battery including a series of negative plates 5 alternated with positive plates 6. All the negative plates are connected by a metallic strap 7 from which a terminal post 8 extends upward through a suitable opening in the cover 2. Similarly all the positive plates are connected by a strap 9 from which a terminal post 10 extends upward through a second opening in the cover 2, there being suitable packing rings 11 between said posts and the adjacent portions of the cover to prevent escape of liquid from the container.

The cover 2 has a filling opening 12 normally closed by a vent cap 13 having an outwardly projecting flange between which and the adjacent portion of the cover is a packing ring or gasket 14.

In accordance with our invention, both the negative plates 5 and the positive plates 6 have a substantial percentage of their respective active materials in the charged state and the said materials moreover are dry. Thus, in a typical case, the negative plates 5 have charged active material in the form of dry, finely-divided metallic lead while the positive plates 6 contain dry lead peroxide as their charged active material.

Further, in accordance with our invention, between the adjacent faces of the plates 5 and 6 are placed perforated, non-absorbent insulating elements or separators whose openings or perforations are large enough to permit of the ready passage therethrough of electrolyte, while at the same time being small enough to prevent bridging of conductive particles of active material from plate to plate, in normal use.

In the case illustrated in Figs. 1, 2, 13, 14, and 15, we employ two separator elements 15 and 16 between the adjacent faces of the negative and positive plates, the elements 15 and 15ᵃ consisting of thin sheets of hard rubber having, in the case shown, series of parallel elongated and relatively narrow openings or perforations 17.

These separator elements are placed against each negative plate, as illustrated, and between each of them and the adjacent faces of each positive plate is placed one of the separator elements 16 which, while being likewise of hard rubber or equivalent non-absorbent material in thin sheet form, is preferably provided with parallel vertical ribs 18 whereby it is spaced away from the separator element 15.

The elements 16 likewise are perforated, in the case shown in Figs. 1 and 2 being formed with narrow elongated slots 19, which like those of the separators 15 are horizontal, although as shown in Fig. 15, one or more of the separating elements as 15ª may have series of vertically-elongated perforations. By the arrangement shown there are formed between each pair of separating elements 15 and 16 vertically-extending chambers or wells from which electrolyte may have free access to the faces of the adjacent plates 5 and 6 through the openings 17 and 19.

As shown in Figs. 3 and 4, there may under certain conditions be employed a single ribbed separator 16 in such position that its flat face lies in contact with one kind of plates, preferably the negative plate.

Again as shown in Figs. 5 and 6, we may provide a ribbed perforated separator 16 between two similar flat perforated separators 15—15 or as indicated in Figs. 9 and 10, we may utilize two ribbed separators 16, 16ª, placed with their flat faces against the adjacent faces of the negative and positive plate and with the ribs 18 alternated or staggered.

In Figs. 11 and 12 is shown another form of separator element consisting of a flat plate 20 having ribs 21 and 22 projecting from both of its faces so that vertically-extended channels or chambers are formed between its body and both plates 5 and 6. One set of these ribs may be of greater height than the other, though as shown at 20ª in Fig. 7 and 8 they may, if desired, be of equal height and have flat perforated separator elements 15 interposed between them and adjacent plates 5 and 6.

It is to be understood that while for certain purposes we prefer to use separators having narrow elongated perforations 19 arranged either as shown in Fig. 1 or as in Fig. 15, we may without departing from our invention employ perforations of other shapes such as those of circular form indicated at 19ª in Fig. 16 or we may make them square as indicated in 19ᵇ in Fig. 17.

In accordance with our invention, the parts of the storage battery cell above described are assembled as shown, or the plate-and-separator element as a unit may be built up independently of the container and cover, with the plates 5 and 6 preferably in a charged or partially charged condition, that is with a substantial percentage of their respective active materials in a charged state and dry. Inasmuch as the separating elements are of non-absorbent materials and hence neither contain, nor are capable of attracting or holding moisture, the battery or renewal elements thereof may be kept indefinitely without deterioration or loss of charge.

The battery or renewal elements may, however, be put into use at either high or low discharge rates very shortly after the container has been filled with suitable electrolyte and without requiring an initial charge, so that while the renewal element or battery may be kept in its dry state indefinitely, it may be started in service at any time without being subjected to the process of charging and requiring the attention, delay and expense incident thereto.

We claim:

1. In combination, dry, reversible negative plates; dry, reversible positive plates; and plate separators of non-absorbent insulating material; the negative and positive plates having a substantial percentage of their respective active materials in a charged state.

2. In combination, dry, negative plates including active material in the form of finely-divided metallic lead; dry positive plates including active material in the form of lead peroxide; and plate separators of non-absorbent insulating material.

3. In combination, dry, reversible, negative plates; dry, reversible positive plates; both of said kinds of plates having a substantial percentage of their respective active materials in a charged state; with separating elements of perforated hard rubber between said plates.

4. In combination, dry, reversible, negative and positive plates both having substantial percentages of their respective active materials in the charged state; with plate separators of impervious material having perforations sufficiently large to permit of the relatively rapid passage of electrolyte to the plates, but small enough to prevent bridging of active material from plate to plate, under normal conditions of use.

5. An unfilled storage battery comprising a container; dry, charged negative and positive plates in said container; and dry non-absorbent insulators spacing apart said plates.

6. The combination of dry, charged negative and positive plates; and a plurality of perforated sheet insulators of impervious material between the opposed faces of said plates.

7. The combination of dry, charged negative and positive plates; with a flat and a ribbed separator between the opposed faces of said plates; said separators being of perforated impervious material.

8. The combination of dry, charged negative and positive plates; with at least one flat and at least one ribbed separator between the opposed faces of said plates; said separators being of impervious sheet material and at least one of them having series of elongated perforations therein.

9. The combination of dry, charged negative and positive plates; with a flat and ribbed perforated separator of impervious material between the opposed faces of said plates; each flat separator being engaged by the ribs of a ribbed separator.

10. The combination of dry, charged negative and positive plates; with at least one flat and at least one ribbed separator of impervious material between the opposed faces of said plates; each separator lying next to a negative plate having narrow, elongated perforations therein.

11. The combination of negative and positive plates; with at least one flat and at least one ribbed separator between the opposed faces of said plates; said separators being of impervious sheet material having series of elongated perforations therein; and the perforations of the ribbed separators extending in lines at right angles to those in the flat separators.

WALTER E. HOLLAND.
WILLIAM H. GRIMDITCH.